United States Patent Office 3,537,947
Patented Nov. 3, 1970

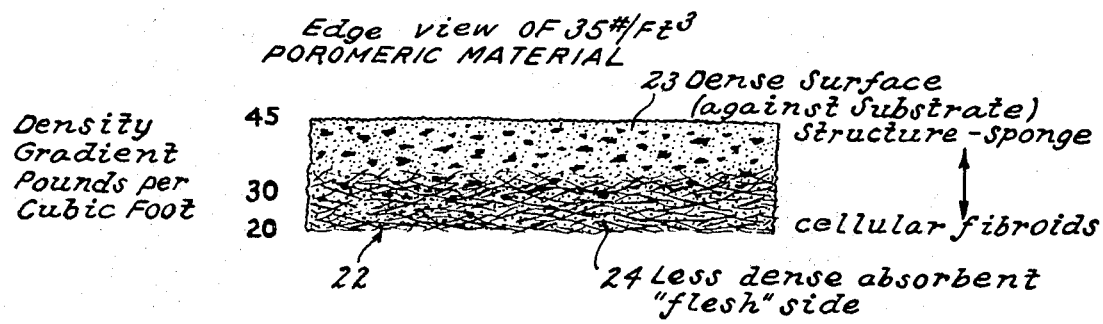
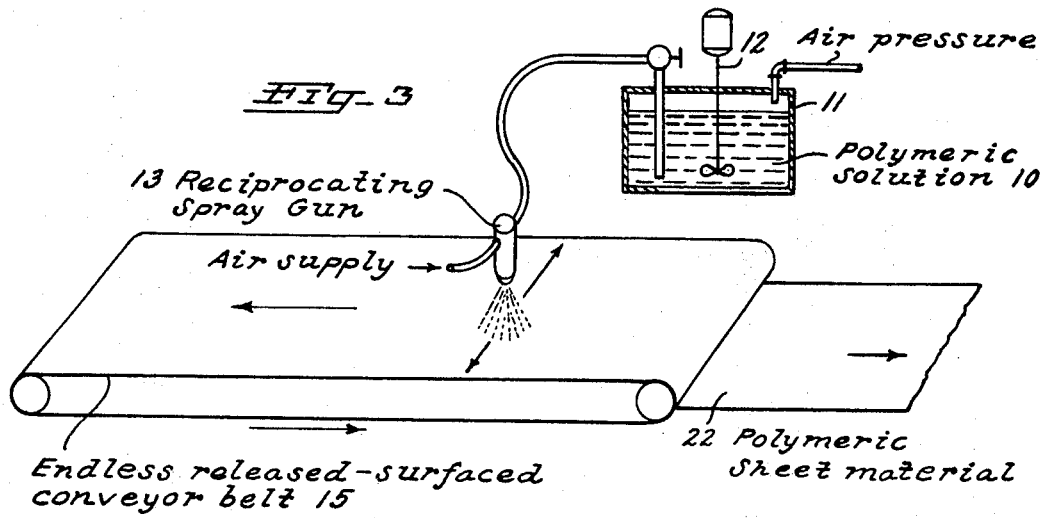
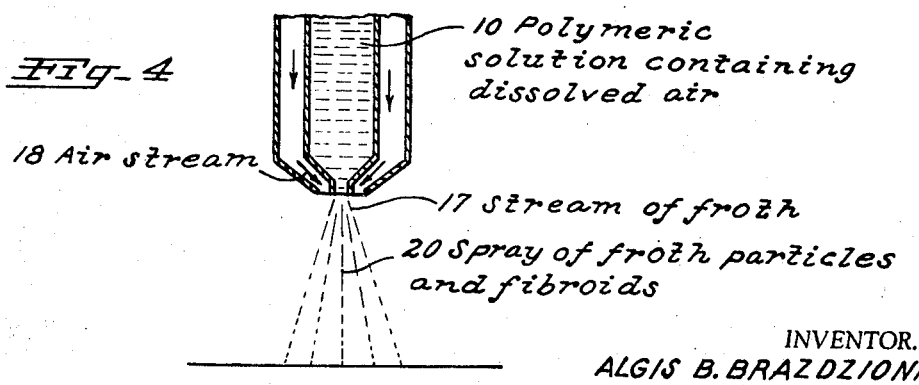

3,537,947
LEATHER-LIKE POROMERIC MATERIAL AND METHOD FOR MAKING THE SAME
Algis B. Brazdzionis, Waterbury, Conn., assignor to Uniroyal, Inc., New York, N.Y.
Filed May 18, 1967, Ser. No. 639,327
Int. Cl. B32b 5/14, 5/22; D06n 3/14
U.S. Cl. 161—166                6 Claims

ABSTRACT OF THE DISCLOSURE

Leather-like poromeric material is made by dissolving an inert gas under pressure in a solution of a normally solid film-forming polymer, and spraying the solution under conditions such that the dissolved gas is suddenly released to form a froth, which is acted upon by a high velocity air stream so that the froth is attenuated and broken up. The thus-sprayed polymer is deposited for example upon a release surface having a leather-like grain. After a layer of the desired thickness is built up, the sprayed deposit is stripped from the release surface. The sheet thus formed is microporous and leather-like. By regulation of the spraying conditions one side of the material may be made to have largely a particulate non-fibrous structure while the other side of the material may be made to have largely a fibrous structure, thus producing a gradation of texture from the front or "top" surface to the "flesh" or rear surface. The poromeric material may be laminated to fabric or other material.

BACKGROUND OF THE INVENTION

Field of the invention

This invention relates to leather-like poromeric material and a method of making same by spraying a solution of a polymer.

Description of the prior art

In recent years a number of synethtic poromeric materials closely resembling natural leather have been disclosed. These materials have aimed at duplicating the breathability of leather, as well as its ductility, flexibility and hand, and its ability to be finished attractively. Methods of making porous sheets have included the spraying of solutions of polymers (see Satas "Porous Sprayed Sheets and Coatings" Industrial and Engineering Chemistry, vol. 57, No. 4, April 1965, page 38; also U.S. Pat. 3,232,819, Feb. 1, 1966).

The present invention is directed to an improved method of making poromeric materials which can be carried out conveniently and economically to make highly satisfactory novel products possesing a desirable combination of properties. More specifically, the present product avoids the coarse hand and harsh feel of certain products not made in accordance with the invention and the present process permits the development of a finer celled, smoother, low density material with high tensile strength even when not reinforced by textile backing or the like. The product has a high strength to weight ratio, breathability with or without porosity, uniformity, high elongation, and post-formability. The product is capable of high surface grain definition, is waterproof on the grain side, but absorbent through the flesh side. Abrasion resistance, ability to be sewed, and high tear resistance, are other features of the product.

SUMMARY OF THE INVENTION

In accordance with the invention, leather-like poromeric material is made by a spraying process typically involving first dissolving an inert gas (e.g., air, nitrogen, carbon dioxide) under pressure in a solution of a normally solid film-forming polymer (e.g., a polyurethane elastomer, a vinyl resin, mixtures of the two, mixtures of vinyl resin with butadiene-arcylonitrile copolymer, thermoplastic block copolymers of styrene and butadiene, etc.) in a volatile organic solvent. A stream of the pressurized gas-containing polymer solution is introduced to a zone of lower pressure with the result that the dissolved gas comes out of solution suddenly, forming bubbles of gas in the stream of solution. Essentially simultaneously the stream of solution is subjected to a high velocity air stream, thus breaking the emerging stream of frothing solution into a spray from which the major portion, but not all, of the solvent quickly evaporates. The frothed spray is directed onto a receiving surface, which may be either smooth or textured, having the contour of the desired article, whether a flat sheet or a molded article such as a shoe or glove. The frothed sprayed material as deposited contains enough residual solvent so that it is soft and tacky enough to weld or stick together to form a coherent film, which has a microporous structure particularly by reason of the interconnecting interstices or voids remaining between the sprayed particles as deposited. The spraying of the froth is continued until a desired thickness has been built up. In making a leather-like sheet, for example, the sheet may then be stripped from the surface on which it was formed, which may be for example a release paper embossed to have a leather-like grain.

To produce a product having a gradation of properties or structure from the initially deposited side (i.e., the "top" or "grain" side) to the last-deposited side (i.e., the "back" or "flesh" side) the spraying conditions during the initial depositing of the froth are such that the froth is deposited largely in the form of droplets or nodules and a relatively dense deposit is thus first built up, and thereafter a further quantity of the froth is sprayed under conditions such that the froth is deposited largely in fibrous form to superimpose a less dense, more open deposit on the first-deposited material. Increasing the distance between the spray gun and the target surface favors the formation of a more fibrous, less dense deposit. Lowering the viscosity of the solution at a given temperature, or decreasing the temperature at a given viscosity, also favors the formation of a more fibrous product. Decreasing the pressure on the solution, or lowering the amount of gas dissolved in the solution, similarly tend to increase the fibrous nature of the material laid down. Any of these variables, or any suitable combination of them, may be regulated to control the character of the deposit.

BRIEF DESCRIPTION OF THE DRAWINGS

The invention will be described with reference to the accompanying drawings, wherein:

FIG. 1 is a flow diagram representing successive steps in the method of the invention;

FIG. 3 is a diagrammatic perspective view of an arrangement of apparatus for carrying out the invention; and FIG. 4 is an enlarged diagrammatic longitudinal sectional view of a spray nozzle for use in the invention.

DESCRIPTION OF PREFERRED EMBODIMENTS

Figure 2:
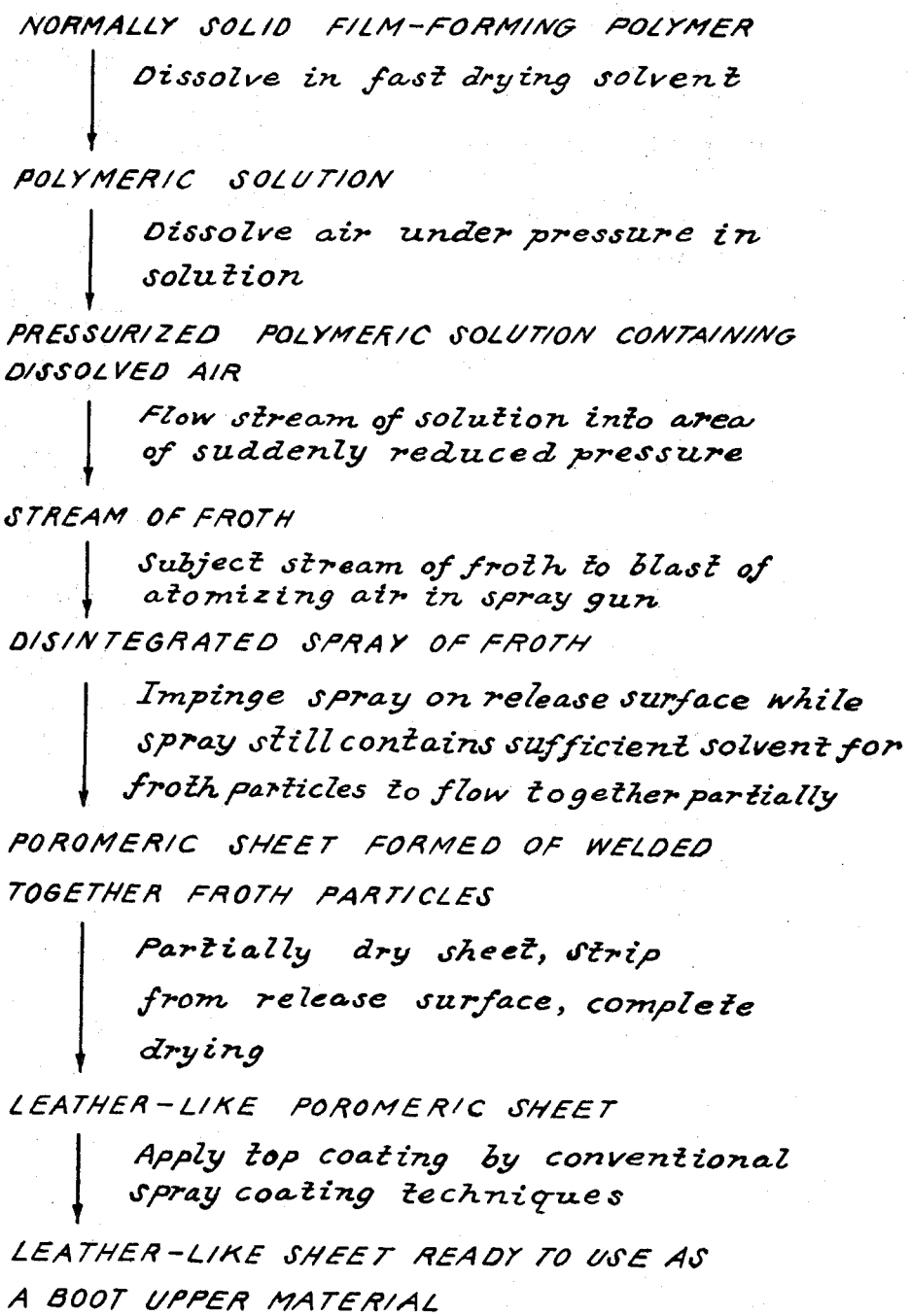
FIG. 2 is a diagrammatic fragmentary cross-sectional view of a poromeric material of the invention.

As indicated, the invention is practiced with a solution of a normally solid film forming polymer in a volatile organic solvent. Particularly suitable are thermoplastic polymers, especially those having an elastomeric quality (elastoplastic or thermolastics) such as the thermoplastic polyurethane elastomers. Vinyl resins (e.g., polyvinyl chloride) may also be used, especially in admixture with other polymers such as polyurethanes or butadiene-acrylonitrile copolymer. Solutions of other thermolastics, such as block copolymers of styrene and butadiene (see, for example, British Pat. 1,025,295, Shell International Research, Apr. 6, 1966) may also be used. Other film-forming polymers, such as nitrocellulose, may be present. If desired thermosetting polymers may be used, that is, curable or vulcanizable materials such as thermosetting polyurethanes or vulcanizable rubbers. The solvents employed include the usual conventional inert volatile organic liquids capable of dissolving the particular polymer or combination of polymers employed, including hydrocarbon solvents (whether aliphatic as in n-hexane, cycloaliphatic as in cyclohexane, or aromatic as in benzene or toluene) or non-hydrocarbon solvents (as in such ketones, ethers, esters, etc. as cyclohexanone, acetone, methyl ethyl ketone, diethyl ether, dimethylformamide, methyl acetate and tetrahydrofuran), and mixtures of such solvents. Diluents, not in themselves effective solvents for the polymers, may be present along with the solvents. Plasticizers may also be present, as well as antioxidants, pigments, and any other suitable desired conventional compounding ingredients.

Preferred polymers for use in the invention are the conventional thermoplastic polyurethane elastomers. Such materials are commercially available and may be described as reaction products of a polymeric polyol such as a glycol (e.g., a polyester glycol or a polyether glycol) with an organic polyisocyanate, usually a diisocyanate, frequently along with a chain extending agent which is usually a low molecular weight bifunctional material having two reactive hydrogens, such as a glycol or diamine. Polyether-based polyurethanes are particularly preferred.

In accordance with the invention as inert gas is dissolved under pressure in the solution of film-forming polymer. Suitable gases include air, nitrogen, and carbon dioxide. To dissolve the gas in the polymer solution a pressure vessel may be filled partially with the polymer solution, and the gas under pressure may be introduced into the space above the solution. Upon standing for a time (e.g., a few hours) sufficient gas will become dissolved in the solution. To maintain the gas in a dissolved condition pressure is maintained on the solution until the spraying operation is undertaken.

In the next step of the process, a stream of the polymer solution containing gas dissolved under pressure is conducted to an area of lower pressure than the pressure under which the gas was dissolved. Thus, a fine stream of the polymer solution may be passed through an orifice or similar restricted passageway. Before being conducted to said orifice the polymer solution is under sufficient pressure to maintain the gas in solution, and at the exit of the orifice the pressure is lower and as a result this sudden reduction in pressure the gas comes out of solution, forming bubbles of gas in the fine stream of flowing polymer solution.

In the process of the invention the moving stream of frothed polymer solution thus formed is now subjected to the disrupting action of a stream of air moving at high velocity with respect to the velocity of the froth. This rapidly moving stream of air atomizes the frothed solution to a spray of finely divided particles of foam from which the bulk of the volatile organic solvent quickly evaporates and is carried away by the air, The sprayed material has the form of particles of froth and/or fibers made of froth, depending upon the spraying conditions, especially the distance from the spray nozzle to the target (close to the nozzle non-fibrous particles in the form of globules or nodules or fine shot tend to predominate; greater spray distances favor the formation of fibrous particles). Regardless of whether the sprayed material is particulate or fibrous, the frothed polymer constituting the thus-atomized material includes bubbles of gas in the interior of the particles or fibers as well as minute hollow spheres or hollow globules of polymer attached to the outside of the particles or fibers. The cells formed in the nodules or fibers by the gas which comes out of solution are predominantly closed cells.

The thus finely divided or atomized spray of polymer is deposited on a collecting surface, the nature of which will depend on the particular product desired. In making flat sheets of unsupported leather-like material, the spray is directed onto a suitable temporary supporting surface, such as a release paper which may be provided with a pattern, such as a negative reproduction of a leather-like grain to impart the grain of leather to the product. Alternatively, if it is desired to form a shaped article, such as a shoe or boot, or a glove, the spray may be directed against a suitably shaped mold. In some cases, it may be desired to deposit the spray onto a base material which becomes part of the final article, such as a woven or knitted textile fabric or a non-woven batt of fibers, or a cheap piece of split-grain leather that it might be desired to up-grade by coating with the poromeric material of the invention.

The sprayed froth as deposited still contains sufficient solvent to render the material soft and tacky with the result that the deposited particles or randomly laid, intermeshed fibers become firmly welded or fused together at points of contact, into a strong, self-supporting sheet. There remain voids or spaces between the particles and intermeshed fibers where the particles or fibers did not touch each other, such voids or spaces contributing microporosity to the thus laid-down sheet. The closed cells, representing the bubbles of gas which were responsible for the frothing or foaming of the liquid stream of polymer solution, avoid the coarser hand, and feeling of harsh polymer globules, associated with materials made by spraying a solution that has not been pre-pressurized with air or similar gas to dissolve the gas in the solution.

Spraying is continued until the desired thickness of poromeric material has been built up. To facilitate building up the desired thickness in a short time a plurality of spraying devices may be used. An endless belt carrying the release surface may be recycled before a spray arrangement for a sufficient number of passes to build up the required thickness, or the release surface may be passed through successive spray areas in sufficient number to deposit the required thickness of material. Reciprocating spray devices transversing a release surface in an overlapping spray pattern may be employed to insure even coverage of a wide area with a minimum of spray devices. Known electrostatic spraying means may be employed to make the spraying more efficient.

Application of the initially sprayed material (the material which contacts the release surface, representing the top or grain surface of the product) in predominantly particulate form (that is, as globules or nodules) insures a relatively dense surface on the product. As the thickness of the product is built up, later deposits are made in predominantly fibrous form (by increasing the distance from the spray gun to the target, or using a solution of lower viscosity, or by lowering the spraying temperature, or by lowering the solution pressure, or by reducing the amount of gas dissolved in the solution, or by a combination of these changes) to provide a less dense, more flexible back or "flesh" side, similar to natural leather. In appropriate cases, the foregoing sequence can be reversed, that is, the less dense, more fibrous material may if desired be deposited first, followed by deposition of more dense, less fibrous material. Such reverse sequence is particularly appropriate when the base onto which the spray is directed becomes a part of the final product.

The sheet material is usually allowed to remain on the release surface until most of the residual solvent has evaporated. After stripping from the form it may be allowed to dry completely in air.

The microporous sheet may be used as such as a leather substitute to make such articles as footwear uppers, gloves, and the like, or the sheet may if desired be post-laminated to other materials, notably woven or knitted textile backings, or non-woven fibrous batts, with the aid of conventional adhesives if required. For example, the poromeric sheet may be laminated to a footwear lining before being converted into footwear uppers. The sheet material may be compressed under heat and pressure to change its density and porosity if desired. It may be embossed or polished, dyed, or coated with leather finishes or top coatings by conventional coating methods such as spraying. The top coated material usually has breathability wtih respect to water vapor but is not porous to an air current.

Frequently the practice of the invention involves dissolving 100 parts by weight of a commercial thermoplastic polyurethane (whether of the polyester type or of the polyether type) in, for example, about 300–700 parts (preferably about 400 parts) of a solvent such as tetrahydrofuran and up to about 400 parts (preferably about 200 parts) of a diluent such as acetone or methyl ethyl ketone, along with up to about 40 parts for example (preferably about 20 parts) of one or more plasticizers such as phosphate types (e.g., tricresyl phosphate, cresyl diphenyl phosphate, octyl diphenyl phosphate), adipate types (e.g., di-butoxyethyl adipate), phthalate types (e.g., butyl benzyl phthalate), or ether types (such as tetraethylene glycol dimethyl ether). Antioxidant in amount up to for example about 10 parts may be included, such as about 2 parts of polycarbodiimide. Pigment is typically included in amount up to for example about 10 parts (dry basis), suitably in the form of a dispersion in a portion of the plasticizer or in a nitrocellulose solution as vehicle. Fillers in amounts up to for example about 20 parts are frequently useful, as exemplified by carbon black, silicates, or carbonates. In many cases the polymer content of the spray solution will range from about 7 to 25% by weight, preferably about 12–15%, while the solids content will frequently range from about 5 to 35% by weight, usually 15–20%. Depending upon the exact formulation, type of spray gun, spraying conditions, etc., the solution viscosity usually ranges from about 100 or less to 2000 or more centipoises, and frequently is about 400 to about 600 centipoises.

To dissolve the air or other inert gas in the solution of polymer, the solution is contacted with the gas under superatmospheric pressure, preferably at least about 10 p.s.i. gauge, although indefinitely higher pressures of 100 or 200 p.s.i. or even more can be used.

The spraying may be carried out at ordinary ambient temperatures (e.g. 70° F.), but it is frequently conducted at a somewhat elevated temperature of about 80° F., or if desired at a more elevated temperature up to for example about 150° F. or higher.

Usually the conventional spray gun employed is operated at an output of 5–150 grams of solution per minute, preferably about 30–60 grams per minute. The atomizing air may be at ambient temperature (e.g., 70° F.), or may be at elevated temperature up to, for example, about 100° F. or more. The atomizing air is frequently delivered at a pressure of 20 to 80 p.s.i., preferably 40–60 p.s.i. The air consumption is typically 4 to 30 cubic feet per minute, preferably about 10–15 c.f.m.

In practice, satisfactory results have been obtained with a commercially available spray gun known as De Vilbiss AGA P–502, equipped with an AGA 404G needle, an AV 15A fluid tip, and a No. 758 air cap.

The linear speed with which the release surface, on which the spray is deposited, advances past the spray gun, the width of the belt and the speed with which the spray gun traverses the belt are governed only by mechanical limitations, but it may be mentioned that good results have been obtained using a belt 20 inches wide advancing past the spray gun at a speed of 12 inches per minute, the gun traverse speed being 12 inches per second. The fan pattern made by the spray gun in such an arrangement may be for example from 1 to 15 inches in width (typically about 12 inches wide) with a 75–100% overlap of fan pattern (typically 95% overlap), the distance from the spray gun nozzle to the belt being from 1 to 36 inches (typically 6–10 inches).

The sprayed deposit is typically allowed to dry on the belt for 30 seconds to 15 minutes at 80° F. Post drying is ordinarily undertaken after stripping from the belt and usually varies from about 24 to 36 hours at ambient or slightly elevated (80° F.) temperatures to a short time (e.g., 5 minutes) at more elevated temperature (e.g., 240° F.).

Many products of the invention made as described from polyurethanes have properties of the following kind:

Tensile strength—500–1200 p.s.i.
Elongation-at-break—250–350%.
Tongue tear strength (Test KK–L–311a No. 2111 from Federal Specification, Leather, Methods of Sampling and Testing)—83–160 lbs./in.
Stitch tear strength (Test KK–L–311a No. 2151)—110–220 lbs./in.
Breaking strength (Mullen ball burst)—80–260 lbs.
Taber abrasion—.01–.10 gms. loss/10,000 cycles.
Low temp. flexing (1″ x 4″ folded sample, flexed 180°)—500,000+cycles at −20° F.
Humid aging—0–50% tensile loss/7 days at 200° F. 100% relative humidity.
Water vapor transmission (Breathability; Payne cup method)—600–3000 gms./hr./100 square meters.

The physical structure of the sprayed material varies with the density. At relatively low density (e.g., 20 pounds per cubic foot) the material is in large part a mixture of medium length fibers (up to 2 inches long) with short fibers (greater than about 0.05 inch long) and some sponge particles, these elements being solvent-welded or bonded together at points of contact. In higher density material (e.g., 45 pounds per cubic foot) it is observed that the material is predominantly made up of sponge particles, bonded to each other by residual solvent action. The density range of interest in connection with the present invention is the 20–45 pounds per cubic foot range, preferably the 35–40 pound range for boot uppers.

Generally the density of the sprayed material depends upon the amount of particle coalescense on substrate which in turn is determined in large part by the amount of residual solvent in the polymer particles. Low density material can be produced by employing high air to solution ratios and effecting efficient solvent evaporation. Thus, low solution feed rate, high atomizing air volume, increased gun to substrate distance and wide fan pattern all tend to evaporate more of the solvent prior to particle deposition upon the substrate. The almost dry particles tend to retain their form and shape with minimal coalescense at points of contact. Conversely, high solvent content after impingement can result in almost complete coalescence producing high density non-porous material. Variation in density within a given sheet cross-section can be achieved by progressively varying the residual solvent content in the sprayed polymer during successive sprayings as the desired thickness is built up. For small density variations (e.g., 10 lbs./cu. ft.) this is best achieved by fan pattern adjustments while larger variations can be obtained by changing the gun distance.

The character of the sprayed particles frequently depends primarily upon the mode of the solvent evaporation. Solvent flashing off from the surface of the atomized particles tends to result in fiber formation if the solution viscosity is low or in the formation of drops if solution viscosity is high. On the other hand, when some of the solvent evaporates by "boiling" within a particle, additional cellular or sponge structure is introduced. This effect is favored by high solution temperature and/or high feed pressure. Such effect augments the frothing or sponge like character resulting from the described use of a polymer solution containing dissolved gas, which comes out of solution and expands within the particles as the pressure is released upon sudden efflux through the spray gun nozzle into the open atmosphere.

The following examples will serve to illustrate the practice of the invention in more detail.

EXAMPLE I

The essential steps of this example may be followed by reference to the flow sheet in FIG. 1 of the drawings. In this example the polymer employed is a conventional commercially available thermoplastic polyether-based polyurethane ("Royalar A–850") which is a reaction product of 2 moles of polytetramethylene ether glycol, 2 moles of 4,4'-diphenylmethane diisocyanate and 1 mole of 1,4-butane diol. A pigment dispersion is provided made up of 15 parts (by weight) of carbon black, 15 parts nitrocellulose (½ sec. RS), 7 parts of ethyl alcohol, 24 parts of ethyl acetate and 39 parts of toluene. The following solution is prepared:

Ingredients: Amounts (parts by weight)
  Polyurethane _____ 283.0
  Pigment dispersion _____ 3.0
  Tetrahydrofuran _____ 1914

This solution has a solids content of 13% and a Brookfield viscosity of 2000 cps. (No. 4 spindle, 20 r.p.m.).

Referring to the drawing, and particularly to FIG. 3 thereof, the solution 10 is placed in a pressure tank 11 equipped with an agitator 12. Air pressure of 30 pounds per square inch is maintained in the space above the agitated solution for 24 hours, at which time the solution is essentially saturated with air, that is, the dissolved air is in substantial equilibrium with the pressurized air in the space above the solution. The tank pressure is then raised to 60 p.s.i. preparatory to spraying through a reciprocating spray gun 13. The pressure of the air supplied to the spray gun is 60 p.s.i., the air consumption is 15 cubic feet per minute. The solution is sprayed at the rate of 46 grams per minute. The receiving surface is a release coated endless conveyor belt 15, 60 inches in circumference, 20 inches wide, travelling at a speed of 12 inches per minute (0.2 inch per second). One complete circuit of the endless belt is considered as one pass. The spray gun reciprocates across the belt for a distance of 18 inches (36 inches per cycle) at a speed of 12 inches per second to give a 3 second cycle time.

Referring to FIG. 4, as the stream of solution 10 issues from the fluid conduit of the spray nozzle the pressure immediately drops, releasing the gas dissolved in the polymer solution and creating a stream of froth 17. At the same time the emerging stream of solution is immediately acted upon by an air stream 18 supplied to the spray gun, in such manner that the resulting spray 20 issuing from the nozzle takes the form of particles which are like globules or nodules, and/or like fibers or fibroids, depending on the spraying conditions, speed of evaporation of the solvent, etc.

In the first pass the distance from the spray nozzle to the release surface is 3⅓ inches. With each successive pass this distance is increased ⅔ inch, until at the eighth and last pass the distance is 8 inches. The spray angle is 74°, and the fan width (spray pattern width) is dependent upon gun height as illustrated by the following:

| Gun height, inches | 2 | 4 | 6 | 8 |
|---|---|---|---|---|
| Fan width, inches | 3 | 6 | 9 | 12 |

The degree of overlap of the spray patern in successive passes is dependent upon the width of the fan as illustrated by the following:

| Fan width, inches | 2 | 3 | 6 | 12 |
|---|---|---|---|---|
| Percent overlap | 70 | 80 | 90 | 95 |

The following table shows the thickness of the material deposited on each pass, as the spray gun-to-target distance is increased progressively:

| Pass No. | Gun-to-target distance (inches) | Thickness deposited per pass (mils) | Density of deposit from each pass (pounds per cubic foot) |
|---|---|---|---|
| 1 | 3⅓ | 2.3 | 47 |
| 2 | 4 | 2.6 | 41 |
| 3 | 4⅔ | 2.9 | 36 |
| 4 | 5⅓ | 3.3 | 32 |
| 5 | 6 | 3.9 | 27 |
| 6 | 6⅔ | 4.3 | 24 |
| 7 | 7⅓ | 4.8 | 22 |
| 8 | 8 | 5.8 | 18 |

After the last pass the spraying is stopped and the resulting sheet material 22 is dried for 5 hours at ambient temperature on the belt. After stripping the material from the belt, the drying is continued for 24 hours at ambient temperature.

Referring to FIG. 2, the product 22 is relatively dense and has a sponge structure in the initially deposited layers 23 ("grain" side) formed against the release substrate, and becomes progressively less dense and more fibrous in the later deposited strata 24 ("flesh" side). The properties of the final sheet are as follows:

Sheet thickness—30 mils
Sheet weight—240 grams
Overall density—28.3 lbs./cu. ft.
Tensile strength—1000 p.s.i.
Elongation—250%
Tongue tear—110 lbs./in.
Stitch tear—150 lbs./in.
Breaking strength—150 lbs.
Taber abrasion—.05 gms./1000 revs.
Low temp. flexing—50,000 at −20° F.
Humid aging—10% tensile loss
Water absorption—30% by volume
Moisture vapor transmission—16 gms./hr./sq. meter The product has the hand, feel, appearance, and qualities of leather. Examination with the microscope reveals that the sponge droplets and fibroids, which are fused or solvent-molded together at points of contact to form the coherent sheet material, are internally cellular, the cells being predominantly closed. The microporosity of the product is a consequence of the minute spaces between the sponge droplets and fibroids.

If this example is repeated without prepressurizing the solution to dissolve air therein under pressure, the product has a coarse hand and harsh globules of polymer can be felt in the product. The density is slightly higher (31.5 lbs./cu. ft.) and the moisture vapor transmission is 20 gms./hr./sq. meter.

EXAMPLE II

This example is carried out similarly to Example I, except that the conventional commercially available polyurethane employed ("Estane 5640 x 071") is based on a polyester, namely, 1,4-butanediol/adipic acid polyester, instead of a polyether as in Example I. The formulation for the solution is as follows:

Ingredients: Parts by weight
  Polyurethane _____ 356.4
  Pigment dispersion _____ 3.6
  Tetrahydrofuran _____ 1260
  Acetone _____ 630

The solids content of the solution is about 16%, solution viscosity 1400 cps. After dissolving air in the solution as in Example I, spraying is commenced under the conditions described in Example I, the solution output being 50 grams per minute. The distance between the spray gun and the release surface is increased as the spraying proceeds. A total of eight passes is employed, with two passes at a given distance, according to the following table:

| Gun height (inches) | Thickness deposited per pass (mils) | Density (pounds per cubic foot) | No. of passes |
|---|---|---|---|
| 4 | 2.7 | 50 | 2 |
| 5 | 3.3 | 42 | 2 |
| 6 | 4.2 | 34 | 2 |
| 8 | 6.0 | 23 | 2 |

After drying as in Example I the final sheet has the following properties:

Sheet thickness—32 mils
Sheet weight—320 grams
Overall density—35 lbs./cu. ft.
Tensile—2000 p.s.i.
Elongation—300%
MVT—10 gms./hr./sq. meter
Flexibility—10,000 at −20° F.
Humid aging—50% tensile loss, 7 days at 200° F. 95% RH

EXAMPLE III

In this example the polyester-based polyurethane of Example II is used and the formulation of the solution is as follows:

Polyurethane _____ 360
Pigment dispersion _____ 4.5
Dibutoxyethyl adipate _____ 90.5
Tetrahydrofuran _____ 1580
Acetone _____ 805

The solids content is 16%, viscosity 550 cps. Air is dissolved in the solution under pressure as in the previous examples and spraying is undertaken at a solution output of 44 grams per minute, following to the procedure of the previous examples, in accordance with the following schedule, with the results tabulated below:

| Gun height (inches) | Thickness per pass (mils) | Density (lbs./cu. ft.) | No. of passes |
|---|---|---|---|
| 4½ | 2.4 | 50 | 2 |
| 5½ | 3.0 | 41 | 3 |
| 6⅔ | 3.8 | 32 | 3 |
| 8 | 5.1 | 24 | 3 |

Total number of passes—11
Sheet thickness—40.5 mils
Sheet weight—385 gms.
Overall density—34 lbs./cu. ft.
Tensile—1000 p.s.i.; elongation 250%
Flexibility—500,000 plus at −20° F.

This sheet, when cemented to rubber coated fleece with the aid of a conventional rubber cement, makes an excellent material for boot uppers. The moisture vapor transmission of the material is 2.5 grams per hour per square meter.

EXAMPLE IV

Polurethane of Example II—285
Pigment disperson—3.3
Dibutoxyethyl adipate—33
Polycarbodiimide—12.7
Tetrahydrofuran—1165
Acetone—586
Solids content—16%
Viscosity—550 cps.
Solution output—50 gms. per min.

The procedure is as in the foregoing examples, except that the solution (containing dissolved air) is sprayed at a constant gun height, instead of increasing the spraying distance as the thickness is built up.

Gun height (in.) _____ 6
Mils per pass _____ 3.7
Density (lbs./cu. ft.) _____ 38
No. of passes _____ 7

Total No. of passes—7
Sheet thickness—26 mils
Sheet weight—280 gms.
Overall density—38 lbs./cu. ft.
Flexibility—250,000 at −20° F.
Humid aging—2% tensile loss, 7 days 100° F. 95% RH.

The poromeric material is cemented to drill type fabric.

Tensile—3000 p.s.i.
Elongation—50%
MVT—7 gm./hr./sq. meter

EXAMPLE V

This is similar to Example IV, except that the polyether polyurethane of Example I is used.

Polyurethane of Example I—500
Lamp black—100
Tetrahydrofuran—2670
Acetone—1330
Solids content—13%
Viscosity—1500 cps.
Solution output—30 gms. per min.

Gun height (in.) _____ 8
Mils per pass _____ 4.7
Density (lbs./cu. ft.) _____ 15
No. of passes _____ 25

Total number of passes—25
Sheet thickness—118 mils
Sheet weight—500 gms.
Overall density—15 lbs./cu. ft.

After drying, the sheet is embossed in a press at 250° F. for 2 minutes.

Tensile—2800 p.s.i.
Elongation—350%
MVT—10 gms./hr./sq. meter

Having thus described my invention, what I claim and desire to protect by Letters Patent is:

1. A method of making a poromeric sheet having a gradation in density and in fibrous content across its thickness comprising
    (a) providing a solution of a film-forming polymer dissolved in a volatile organic solvent,
    (b) dissolving an inert gas under pressure in the solution,
    (c) spraying the solution under such conditions that the pressure is suddenly released and the gas comes out of solution, forming a froth from which the bulk of the solvent evaporates during the spraying, said froth being composed of polymer containing predominantly closed cells formed by the gas coming out of solution, the polymer being in the form of particles or fibers having bubbles of gas in the interior with hollow spheres of polymer attached to the outside of the particles and fibers,
    (d) passing a receiving surface repeatedly before the spray to build up a plurality of coherent poromeric layers of deposited froth on said receiving surface by coalescence of polymer particles and fibers at points of contact, until a desired thickness is reached,
    (e) progressively varying the distance between the point of formation of the spray and the point of deposition of the spray in step (d) whereby the layers deposited at the lesser spraying distances are relatively dense and non-fibrous and whereby the layers deposited at the greater spraying distances are less dense and fibrous, the said closed cells in the polymer and the said hollow spheres of polymer on the particles and fibers serving to impart a soft hand to the sheet.

2. A method of making a poromeric sheet material resembling leather comprising dissolving a thermoplastic polymer in a volatile organic solvent, contacting the resulting solution with an inert gas under pressure while agitating the solution until substantially saturated with the gas at said pressure, spraying the solution to form a froth as a result of said dissolved gas coming out of solution during the spraying, the said froth being composed of polymer containing predominantly closed cells formed by the gas coming out of solution, the polymer being in the form of particles or fibers having bubbles of gas in the interior with hollow spheres of polymer attached to the outside of the particles and fibers, depositing the resulting frothed spray on a receiving surface while the spray still contains sufficient solvent to form a coherent poromeric sheet, repeating such deposition of spray a sufficient number of times to build up a desired thickness in the deposit, the distance between the point of formation of the spray and the point on which the spray is deposited being increased as the spraying is continued, whereby later deposited material has a more fibrous character than earlier deposited material to produce a gradation in density across the thickness of the completed sheet, the said closed cells in the polymer and the said hollow spheres of polymer on the outside of the particles and fibers serving to impart a soft hand to the sheet.

3. A method as in claim 2 in which the said polymer is a polyurethane elastomer.

4. A method as in claim 2 in which said inert gas is air.

5. A poromeric material having a soft hand comprising a sheet of normally solid film-forming polymer in the form of nodules and fibers of froth coalesced together at points of contact, said nodules and fibers having closed cells in their interior and having hollow spheres of polymer attached to their outside, the said sheet varying in density across its thickness from one face to the other, with a predominance of polymer in the form of fibers toward one face and a predominance of polymer in the form of nodules toward the opposite face.

6. A poromeric material as in claim 5 in which the said polymer is a polyurethane.

References Cited
UNITED STATES PATENTS

| | | | |
|---|---|---|---|
| 2,881,141 | 4/1959 | Smythe | 260—2.5 |
| 3,227,664 | 1/1966 | Blades et al. | 260—2.5 |
| 3,232,819 | 2/1966 | Satas | 161—159 XR |
| 3,385,916 | 5/1968 | Parrish et al. | 264—50 |

ROBERT F. BURNETT, Primary Examiner

W. A. POWELL, Assistant Examiner

U.S. Cl. X.R.

117—21, 29, 104; 156—78, 279; 161—158, 159, 170